United States Patent [19]

Carr et al.

[11] Patent Number: 5,008,747
[45] Date of Patent: Apr. 16, 1991

[54] SIGNAL CODING

[75] Inventors: Michael D. Carr; Anthony R. Leaning, both of Ipswich, England

[73] Assignee: British Telecommunications public limited company, United Kingdom

[21] Appl. No.: 364,442
[22] PCT Filed: Oct. 17, 1988
[86] PCT No.: PCT/GB88/00871
§ 371 Date: Jun. 2, 1989
§ 102(e) Date: Jun. 2, 1989
[87] PCT Pub. No.: WO89/04101
PCT Pub. Date: May 5, 1989

[30] Foreign Application Priority Data

Oct. 19, 1987 [GB] United Kingdom ............... 8724789

[51] Int. Cl.[5] .................................. H04N 7/13
[52] U.S. Cl. .............................. 358/136; 358/135
[58] Field of Search ............... 358/133, 135, 136, 105

[56] References Cited

U.S. PATENT DOCUMENTS

| 4,369,464 | 1/1983 | Temime | 358/136 |
| 4,542,411 | 9/1985 | Imanaka et al. | 358/133 |
| 4,591,909 | 5/1986 | Kuroda | 358/136 |
| 4,667,233 | 5/1987 | Furukawa | 358/136 |
| 4,717,957 | 1/1988 | Santamäki | 358/136 |
| 4,734,767 | 3/1988 | Kaneko | 358/135 |

FOREIGN PATENT DOCUMENTS

WO87/02854 5/1987 PCT Int'l Appl. .

Primary Examiner—Howard W. Britton
Attorney, Agent, or Firm—Nixon & Vanderhye

[57] ABSTRACT

The current frame of the picture is compared block-by-block with the previous frame to identify changed picture elements (pixels). The resulting matrix is matched ("vector quantized") to one of a set of standard matrices ("VQ shapes"). Only those pixels flagged by the selected VQ shape are transmitted plus a "VQ shape code". This technique is modified in that the current frame is also compared with a "background" frame stored at the transmitter and at the receiver. Where, for any block, all the pixels flagged by the VQ shape are indicated by the second comparison as being the same as the background, the pixels are not sent—instead a shape code plus a "copy background" instruction is transmitted.

10 Claims, 2 Drawing Sheets

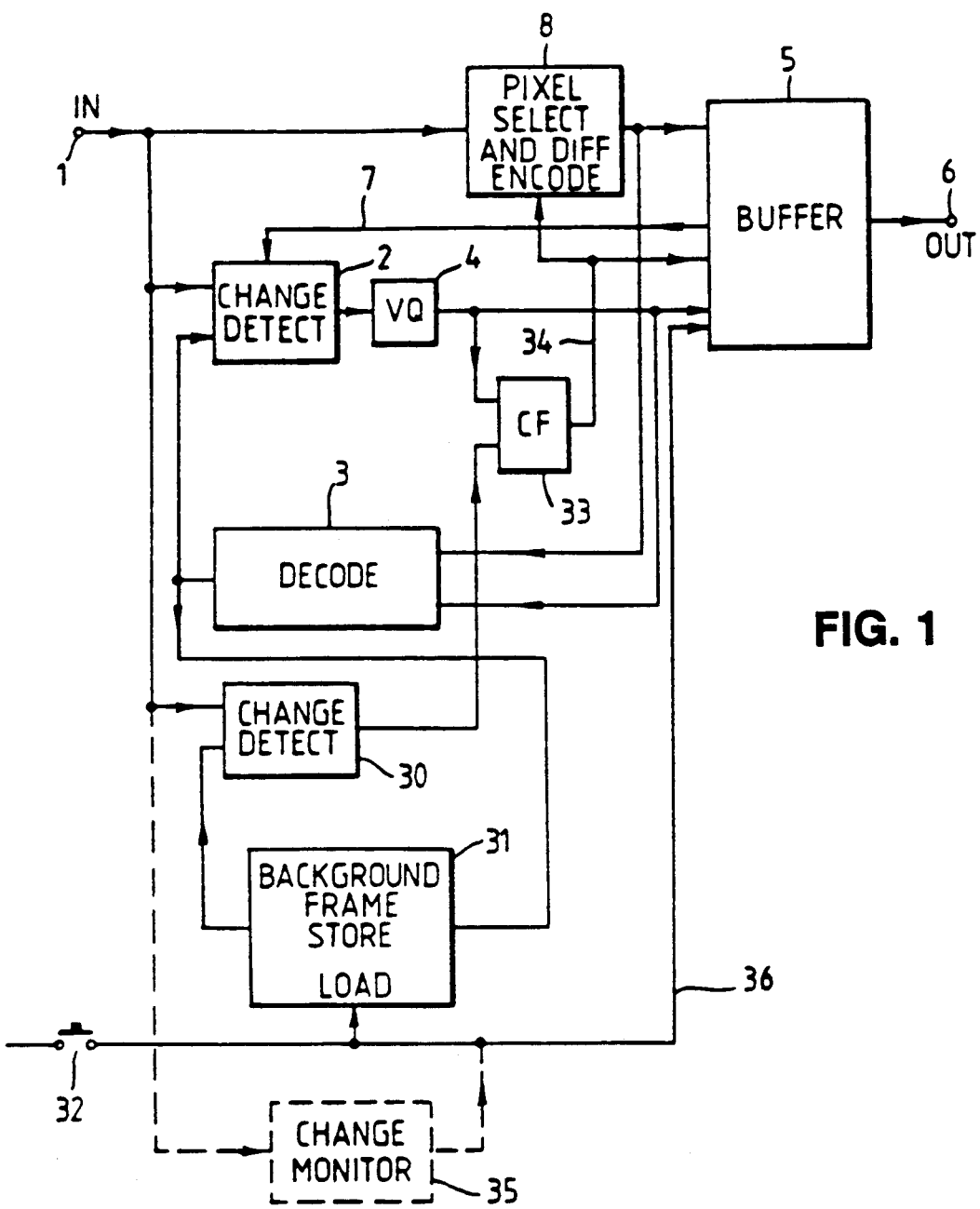

| FIG. 3(a) | FIG. 3(b) | FIG. 3(c) | FIG. 3(d) |
|---|---|---|---|
| 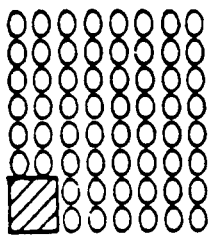 | 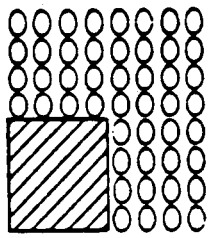 | 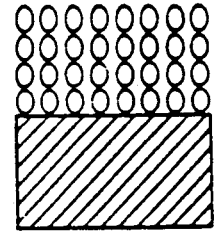 | 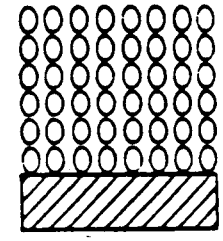 |
| FIG. 3(e) | FIG. 3(f) | FIG. 3(g) | FIG. 3(h) |
| 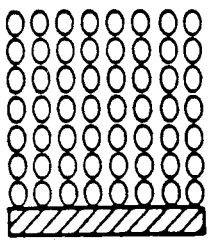 | 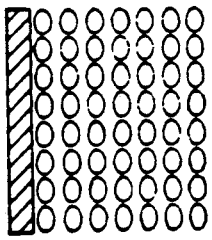 | 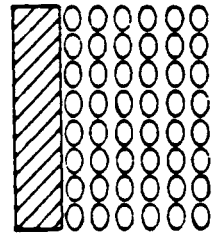 | 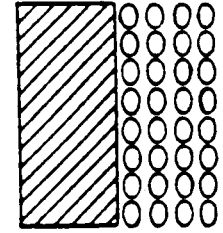 |
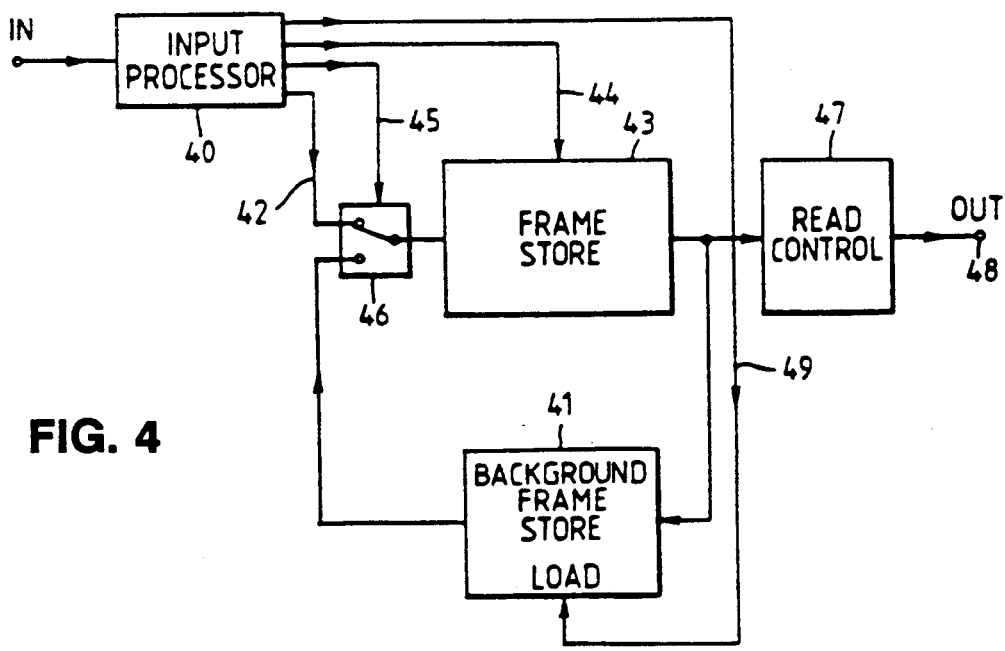
FIG. 4

SIGNAL CODING

This application is related to commonly assigned copending application Ser. No. 07/364,441 filed June 2, 1989 naming Messrs. Carr, Perini, O'Donnell and Leaning as inventors and claiming priority dates of Aug. 28 1987 and Oct. 19, 1987 via PCT/GB88/00709 filed Aug. 26 1988.

The present invention relates to coding of video signals, especially using conditional replenishment coding, where information is generally transmitted only in respect of elements of a frame of the picture which have changed relative to a previous frame; the transmitted data being used at a receiver to update a stored version of the picture.

Thus picture elements of each block of an image to be coded are compared with those of the corresponding block of a previously coded image to determine whether the block has changed between the two images; if so, picture element data are generated for output.

Such a system is described in international patent application published under no. WO86/03922, which also proposes that the block be compared with the corresponding block of an earlier (reference) image. If they are deemed to be the same, no picture data are generated—instead, a codeword is produced to indicate that the receiver is to obtain its data from a locally stored replica of the reference image.

According to one aspect of the present invention, there is provided a method of coding an image comprising, for each of a plurality of blocks of an image:

(i) comparing picture elements of the block with those of the corresponding block of a previously coded image to produce a matrix of values each indicating whether the corresponding element is, in accordance with a predetermined criterion, deemed to have changed between the two images;

(ii) matching the matrix to one of a predetermined set of such matrices each of which identifies a region of the block as being deemed to have changed, and generating a codeword identifying that one matrix of the set;

(iii) comparing picture elements of the block with those of the corresponding block of a reference image composed of blocks from at least one earlier frame to determine whether the block is, in accordance with a predetermined criterion, deemed to have changed between the two images;

(iv) coding for output those elements within the identified region, unless all the elements within the region are identified by comparison step (iii) as being unchanged relative to the reference image, whereupon a codeword indicating this is generated.

In another aspect, the invention provides an apparatus for coding an image comprising, (i) means for comparing, for each of a plurality of blocks of an image, picture elements of the block with those of the corresponding block of a previously coded image to produce a matrix of values each indicating whether the corresponding element is, in accordance with a predetermined criterion, deemed to have changed between the two images;

(ii) means for matching the matrix to one of a predetermined set of such matrices each of which identifies a region of the block as being deemed to have changed, and generate a codeword identifying that one matrix of the set;

(iii) a store arranged to store a reference image composed of blocks from at least one earlier frame and means for comparing picture elements of the block with those of the corresponding block of the reference image to determine whether the block is, in accordance with a predetermined criterion, deemed to have changed between the two images;

(iv) means for coding for output those elements within the identified region, unless all the elements within the region are identified by the means for comparing as being unchanged relative to the reference image, whereupon a codeword indicating this is generated.

The matching step—often termed vector quantisation—of two-dimensional maps has been proposed previously for picture coding, for example in European patent application Ser. No. 0239076A, where blocks of transform coefficient blocks are classified.

The present invention, however, further exploits the vector quantisation, in that not only can the classification be used (if desired) to reduce the amount of information that has to be transmitted to indicate which elements have been coded for output, but also the number of occasions on which a "reference" codeword is instead generated are increased.

Some embodiments of the invention will now be described, by way of example, with reference to the accompanying drawings, in which:

FIG. 1 is a block diagram of a coder according to one embodiment of the invention;

FIG. 2 shows a typical bit map produced by the change detector of the coder of FIG. 1;

FIGS. 3a-3b illustrates a few standard bit patterns used by the vector quantiser of the coder of FIG. 1; and FIG. 4 is a block diagram of a decoder according to another embodiment of the present invention.

FIG. 1 shows a conditional replenishment video coder, where video signals (assumed to be in digital form) are supplied to an input 1. The current frame of a picture is compared in a change or movement detector 2 with the output of a local decoder 3. The local decoder produces a "previous frame" output which is the same as that produced by a remote decoder; the object of the comparison is to identify those parts of the picture which have changed so that only information concerning those parts needs to be sent to the decoder, to update a stored representation of the frame.

The signals are processed on a block-by-block basis—an 8×8 block is assumed—and the change detector 2 therefore produces an 8×8 bit map. A typical map is shown in FIG. 2, where the elements of the block corresponding to picture elements (pixels) which have changed are shown shaded.

In practice, transmission of information concerning only the changed elements involves a significant addressing overhead and therefore it is preferred to match the bit map to one of a limited number—typically forty—of standard shapes (a few are illustrated in FIG. 3). Since it is preferable to transmit information for an unchanged pixel than to fail to transmit information for a changed pixel, the shape chosen is the smallest (i.e. with the least number of shaded elements) which has a shaded area covering the shaded elements of the bit map. This process is termed vector quantisation (VQ) and is indicated as vector quantiser 4 in FIG. 1. One transmits, for the block, a VQ number identifying the chosen shape, along with information concerning pixels deemed—in accordance with the chosen shape—to have changed. The output data are combined and buffered in a buffer 5 prior to passage to an output 6. As is conventional in such systems, the buffer is used to smooth variations in the rate at which data are generated (due to the picture element dependent coding) and interface to a regular transmitted rate and the buffer fullness state used to control the rate of generation (e.g. by varying the change detector thresholds (control line 7)).

The pixels deemed to have changed are coded in an encoder 8 (for example in the manner described in our International patent application PCT/GB88/00709 and European patent application no. 88307981.6.

Many televised scenes—especially in a videoconference or videotelephone environment—contain moving persons or objects set against a fixed background. Pixels observed as changed by the change detector 2 will relate either to objects which have changed their position (or entered the scene) or to parts of the background uncovered by the object. In the present coder, a second change detector 30 is also shown, which compares the current frame with a reference or background frame stored in a frame with a reference or background frame stored in a frame store 31. Acquisition of the stored background frame will be discussed further below, but in FIG. 1 is assumed to have been acquired from the local decoder 3 in response to manual operation of a switch 32 at the commencement of a transmission; a code being transmitted to the receiver to initiate similar action at the remote decoder.

The change detector 30 produces a bit map identifying those pixels of the current frame which are the same as the background.

If this shows that the new image is different from the background for any of the pixels declared as changed by the VQ shape the background information cannot be used and information concerning those pixels is transmitted along with the VQ number.

If, however, the changed area as given by the VQ shape covers only pixels which are identified by the detector 30 as being the same as the corresponding pixels of the stored background frame, then the VQ number is accompanied by a reserved codeword indicating "background" and no further information needs to be transmitted for the block in question.

These functions are accomplished in FIG. 1 by a comparator 33 whose output 34 overrides the operation of the encoder 8.

FIG. 4 shows a decoder. An input processor 40 receives the coded input signals. The background frame is stored in a background store 41. In normal operation, the processor 40 uses the pixel information received to update via line 42 the contents of a frame store 43, using the received VQ numbers via line 44 to control the frame store addressing. When, however, it receives the reserved "background" codeword (via line 45), it recovers the relevant pixels (identified by the VQ number) from the background store 41 and enters them into the frame store 43. This is illustrated schematically by a changeover switch 46. The frame store 43 is read out (by output control means 47) to produce the received video at an output 48. As in the coder, the background store 41 is loaded from the decoded image in store 43 when a 'load background' instruction is received (line 49).

Note that the local decoder 3 of FIG. 1 can be of the same construction as the decoder of FIG. 4, although, of course, in practice the local decoder would use the background store 31 rather than contain one of its own.

The change detectors 2,30 can in principle be any conventionally used, or may both be as described in our above-mentioned patent applications. The vector quantiser 4 can again be a known device. One possibility is that described in our International patent application no. PCT/GB87/00816 (published no. WO88/04084 and European patent application no. 8627787 (published no. 0272794).

Simpler but cruder, another option is to convert the $8 \times 8$ matrix to a $4 \times 4$ matrix by creating each 'new' element as an OR function of four 'old' elements; this reduces the number of elements in the matrix to a size (16) which can be used to address a look-up table—in the form of a 64 Kbyte read only memory in which the appropriate VQ numbers are stored.

The background scene may be 'frozen' manually at the commencement of a transmission. It may, but does not have to, consist solely of a fixed background. For example it may include seated figures (thereby covering the situation where a person momentarily passes his hand over his face if the face forms part of the "background", the face does not have to be retransmitted).

It may be desirable to include provision for updating the background. For example, the incoming video could be monitored at the coder (by a unit 35 shown dotted in FIG. 1) and parts of the picture which differ from the original background but have remained unchanged for a predetermined period of time inserted into the frame store, a signal being sent (via line 36) to the decoder to instruct it to do likewise.

An alternative method of updating the background store abandons any attempt at identifying genuine background, but instead forms a reference image which is a composite of blocks taken from preceding images over a period. Each frame period, data for a few (e.g. eight) selected blocks scattered over the image area is entered into the background stores, the block selection being such that different blocks are selected from each frame until the whole image area has been covered. Assuming 1024 blocks per frame at 25 frames per second, this represents a period of approximately 40 seconds. The blocks could be loaded from the frame store 43 of the decoder, and a corresponding store in the local decoder 3, the change monitor then being replaced by a simple address generator 35 to select the appropriate blocks. Clearly, this is less effective, in that some blocks of the reference image will not represent background material, but a significant coding advantage is still obtained, and it has the merit of simplicity.

A variation of this approach provides that data for selected blocks, instead of being drawn from the decoded image, are actually transmitted—i.e. transmission of the whole block is forced even if only a part, or none, of it is indicated by the detector 2 and quantiser 4 as moving. In this case, the frame stores 31, 41 take their input from the input 1 and processor 40 respectively. This also has the benefit of ensuring that transmission errors on blocks which rarely change do not persist in the decoded image.

We claim:

1. A method of coding an image comprising, for each of a plurality of blocks of an image:
    (i) comparing picture elements of the block with those of the corresponding block of a previously coded image to produce a matrix of values each indicating whether the corresponding element is, in accordance with a predetermined criterion, deemed to have changed between the two images;

(ii) matching the matrix to one of a predetermined set of such matrices each of which identifies a region of the block as being deemed to have changed, and generating a codeword identifying that one matrix of the set;

(iii) comparing picture elements of the block with those of the corresponding block of a reference image composed of blocks from at least one earlier frame to determine whether the block is, in accordance with a predetermined criterion, deemed to have changed between the two images;

(iv) coding for output those elements within the identified region, unless all the elements within the region are identified by comparison step (iii) as being unchanged relative to the reference image, whereupon a codeword indicating this is generated.

2. A method of coding an image comprising, for each of a plurality of blocks of an image:

(i) comparing picture elements of the block with those of the corresponding block of a previously coded image to produce a matrix of values each indicating whether the corresponding element is, in accordance with a predetermined criterion, deemed to have changed between the two images;

(ii) matching the matrix to one of a predetermined set of such matrices each of which identifies a region of the block as being deemed to have changed, and generating a codeword identifying that one matrix of the set;

(iii) comparing picture elements of the block with those of the corresponding block of a reference image composed of blocks from at least one earlier frame to determine whether the block is, in accordance with a predetermined criterion, deemed to have changed between the two images;

(iv) coding for output those elements within the identified region, unless all the elements within the region are identified by comparison step (iii) as being unchanged relative to the reference image, whereupon a codeword indicating this is generated; and (v) wherein in the coding of the elements within the identified region, at least some of the elements are coded as the difference between that element and a predicted value for that element derived from one or more previously coded elements of the block, the sequence of coding of the elements being dependent on the orientation of the identified region.

3. An apparatus for coding an image comprising,
(i) means for comparing, for each of a plurality of blocks of an image, picture elements of the block with those of the corresponding block of a previously coded image to produce a matrix of values each indicating whether the corresponding element is, in accordance with a predetermined criterion, deemed to have changed between the two images;

(ii) means for matching the matrix to one of a predetermined set of such matrices each of which identifies a region of the block as being deemed to have changed, and generate a codeword identifying that one matrix of the set;

a store arranged to store a reference image composed of blocks from at least one earlier frame and means for comparing picture elements of the block with those of the corresponding block of the reference image to determine whether the block is, in accordance with a predetermined criterion, deemed to have changed between the two images;

(iv) means for coding for output those elements within the identified region, unless all the elements within the region are identified by said means for comparing as being unchanged relative to the reference image, whereupon a codeword indicating this is generated.

4. A decoder for use with the coder of claim 3, comprising:

(a) a frame store for storing a received image;
(b) a second frame store;
(c) control means responsive to received data to update the contents of the second frame store using the received data and responsive to a received codeword to update the second frame store with information from the first frame store;
(d) means for repetitively reading the contents of the second frame store to produce a video output signal.

5. An apparatus for coding an image comprising:

(i) means for comparing, for each of a plurality of blocks of an image, picture elements of the block with those of the corresponding block of a previously coded image to produce a matrix of values each indicating whether the corresponding element is, in accordance with a predetermined criterion, deemed to have changed between the two images;

(ii) means for matching the matrix to one of a predetermined set of such matrices each of which identifies a region of the block as being deemed to have changed, and generate a codeword identifying that one matrix of the set;

(iii) a store arranged to store a reference image composed of blocks from at least one earlier frame and means for comparing picture elements of the block with those of the corresponding block of the reference image to determine whether the block is, in accordance with a predetermined criterion, deemed to have changed between the two images;

(iv) means for coding for output those elements within the identified region, unless all the elements within the region are identified by said means for comparison as being unchanged relative to the reference image, whereupon a codewood in dicating this is generated; and (v) means for comparing successive images to identify parts of the image which have remained unchanged for a predetermined period of time, and in the event of such parts being identified, to:
(a) update the stored reference image; and
(b) code for output data indicating which parts of the reference image have been this updated.

6. An apparatus for coding an image comprising;

(i) means for comprising, for each of a plurality of blocks of an image, picture elements of the block with those of the corresponding block of a previously coded image to produce a matrix of values each indicating whether the corresponding element is, in accordance with a predetermined criterion, deemed to have changed between the two images;

(ii) means for matching the matrix to one of a predetermined set of such matrices each of which identifies a region of the block as being deemed to have changed, and generate a codeword identifying that one matrix of the set;

(iii) a store arranged to store a reference image composed of blocks from at least one earlier frame and means for comparing picture elements of the block with those of the corresponding block of the reference image to determine whether the block is, in accordance with a predetermined criterion, deemed to have changed between the two images;

(iv) means for coding for output those elements within the identified region, unless all the elements within the region are identified by said means for comparison as being unchanged relative to the reference image, whereupon a codeword indicating this is generated; and (v) means arranged in operation to effect periodic replacement of a minority of the blocks of the reference image stored in the store by the corresponding blocks of a recent image, the blocks being differently selected for successive replacements such that the store always contains a composite image made up of blocks from a plurality of frames of the image being coded.

7. A method for coding an image comprising:
(i) comparing, for each of a plurality of blocks of an image, picture elements of the block with those of the corresponding block of a previously coded image to produce a matrix of values each indicating whether the corresponding element is, in accordance with a predetermined criterion, deemed to have changed between two images;

(ii) matching the matrix to one of a predetermined set of such matrices each of which identifies a region of the block as being deemed to have changed, and generating a codeword identifying that one matrix of the set;

(iii) storing a reference image composed of blocks from at least one earlier frame and comparing picture elements of the block with those of the corresponding block of the reference image to determine whether the block is, in accordance with a predetermined criterion, deemed to have changed between the two images;

(iv) coding for output those elements within the identified region, unless all the elements within the region are identified by said means for comparison as being unchanged relative to the reference image, whereupon a codeword indicating this is generated; and (v) comparing successive images to identify parts of the image which have remained unchanged for a predetermined period of time, and in the event of such parts being identified, to:
(a) update the stored reference image; and
(b) code for output data indicating which parts of the reference image have been thus updated.

8. A method for coding an image comprising:
(i) comparing, for each of a plurality of blocks of an image, picture elements of the block with those of the corresponding block of a previously coded image to produce a matrix of values each indicating whether the corresponding element is, in accordance with a predetermined criterion, deemed to have changed between the two images;

(ii) matching the matrix to one of a predetermined set of such matrices each of which identifies a region of the block as being deemed to have changed, and generating a codeword identifying that one matrix of the set;

(iii) storing a reference image composed of blocks from at least one earlier frame and comparing picture elements of the block with those of the corresponding block of the reference image to determine whether the block is, in accordance with a predetermined criterion, deemed to have changed between the two images;

(iv) coding for output those elements within the identified region, unless all the elements within the region are identified by said comparison in step (iii) as being unchanged relative to the reference image, whereupon a codeword indicating this is generated; and (v) effecting periodic replacement of a minority of the blocks of the reference image stored in the store by the corresponding blocks of a recent image, the blocks being differently selected for successive replacements such that the store always contains a composite image made up of blocks from a plurality of frames of the image being coded.

9. A method for transmission coding each of a plurality of two-dimensional blocks of image data within each of a series of successively occurring digitized two-dimensional images, said method comprising:
vector quantizing detected image changes which occur within predefined portions one of plural of each block between successively occurring image frames;
comparing said detected image changes within said one predefined portion of a block to a previously stored reference image to detect whether the detected new image data now all correspond to said reference image for that portion and, if so, generating a corresponding codeword; and
coding for an output transmission representing each successive block either
(i) the actual values for the vector quantized portion of that block; or
(ii) said codeword.

10. Apparatus for transmission coding each of a plurality of two-dimensional blocks of image data within each of a series of successively occurring digitized two-dimensional images, said apparatus comprising:
means for vector quantizing detected image changes which occur within one of plural predefined portions of each block between successively occurring image frames;
means for comparing said detected image changes within said one predefined portion of a block to a previously stored reference image to detect whether the detected new image data now all correspond to said reference image for that portion and, if so, generating a corresponding codeword; and
means for coding for transmission output representing each successive block either
(i) the actual image values for the vector quantized portion of that block; or
(ii) said codeword.

* * * * *